United States Patent [19]
Martzloff

[11] 3,742,419
[45] June 26, 1973

[54] INTEGRAL SENSOR FOR MONITORING A METAL OXIDE VARISTOR

[75] Inventor: Francois D. Martzloff, Schenectady, N.Y.

[73] Assignee: General Electric Company, Schenectady, N.Y.

[22] Filed: Sept. 30, 1971

[21] Appl. No.: 185,184

[52] U.S. Cl. .................. 338/20, 73/362 SC, 338/22
[51] Int. Cl. .............................................. H01c 7/10
[58] Field of Search ................ 338/13, 20, 21, 324, 338/325, 322; 73/362 SC; 323/68, 69

[56] References Cited
UNITED STATES PATENTS
3,622,849  11/1971  Kelley ............................ 323/69 X
2,747,158  5/1956  LeBel ............................. 323/69

FOREIGN PATENTS OR APPLICATIONS
783,669  9/1957  Great Britain ................. 73/362 SC Primary Examiner—C. L. Albritton
Attorney—Frank L. Neuhauser, John F. Ahern et al.

[57] ABSTRACT

A body of sintered metal oxide material having first and second opposed surfaces and a third surface disposed therebetween has first and second electrodes in contact with the first two opposed surfaces for establishing a main conductive path through the device and a third electrode in contact with one of the two opposed surfaces and spaced very close to the corresponding electrode for establishing a monitoring conductive path for sensing the operating temperature of the body as a function of the resistance thereof. The monitoring path may also be established by a pair of third electrodes positioned on opposite sides of the surface interconnecting the first two surfaces whereby the monitoring path intersects the main conductive path. The sintered metal oxide material has varistor characteristics.

13 Claims, 6 Drawing Figures

INTEGRAL SENSOR FOR MONITORING A METAL OXIDE VARISTOR

My invention relates to a means integral with a metal oxide varistor for monitoring the temperature state thereof, and in particular, to the use of an auxiliary electrode or electrodes for establishing a monitoring conductive path in close proximity to the main conductive path or in intersection therewith.

Devices which exhibit nonlinear resistance characteristics are generally known as varistors and have many circuit applications for voltage surge protection. Although varistor devices have many advantageous characteristics, they are, as most other devices, susceptible to excessive power dissipation due to overload operation, connection in the wrong circuit, or use of a lower rated device than required, which can cause thermal runaway and destruction of the device. No known means are currently available for monitoring the temperature state of a varistor, and in particular, to a means which is integral with the varistor device such that there is no time delay as is inherent in the heat transfer from the varistor material to an external temperature sensor.

Therefore, a principal object of my invention is to provide a temperature sensor integral with a varistor device for monitoring the temperature state thereof.

Another object of my invention is to provide the temperature sensor integral with a metal oxide varistor device.

A further object of my invention is to provide the sensor with a monitoring conductive path close to the main conductive path through the device.

A still further object of my invention is to provide the sensor with a monitoring conductive path intersecting the main conductive path.

In accordance with my invention, I provide a body of metal oxide varistor, also referred to herein as MOV, a trademark of the General Electric Company, material having first and second opposed major surfaces and a third surface therebetween. First and second electrodes, which define the main conductive path through the MOV material, are in respective contact with the first and second opposed surfaces. A third electrode in contact with the first surface is positioned in close proximity to the first electrode for establishing a monitoring conductive path very close to the main conductive path for monitoring the operating temperature of the MOV body as a function of the resistance thereof sensed by the third electrode. In a second embodiment, a pair of sensing electrodes are in contact with the third surface of the MOV body for establishing the monitoring conductive path in intersecting relationship with the main conductive path. The MOV body through its monitoring conductive path is connected in a resistor bridge circuit for obtaining a read-out voltage signal indicative of the operating temperature of the MOV body.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

Figure 1A:
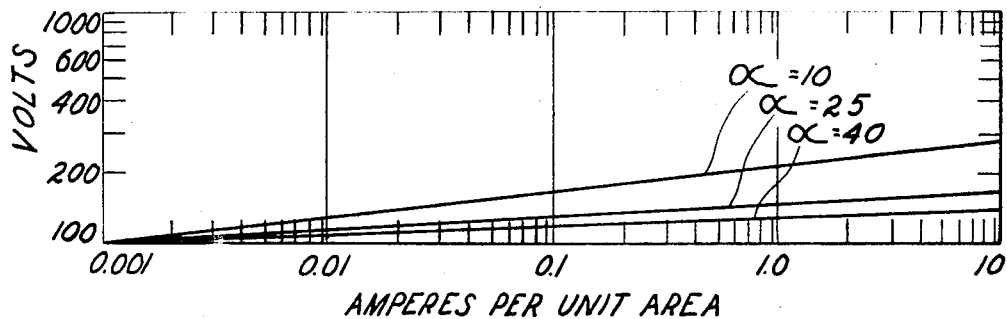
FIG. 1a is a graphical representation of the nonlinear resistance and resultant voltage limiting characteristics of the MOV material for different values of the exponent alpha plotted in terms of volts versus amperes on a log-log scale.

There are a few known materials which exhibit nonlinear resistance characteristics and which require resort to the following equation to relate quantitatively current and voltage by the power law:

$$I = (V/C)^\alpha$$

where $V$ is the voltage between two points separated by a body of the material under consideration, $I$ is the current flowing between the two points, $C$ is a constant and $\alpha$ is an exponent greater than 1. Both $C$ and $\alpha$ are functions of the geometry of the body formed from the material and the composition thereof, and $C$ is primarily a function of the material grain size whereas $\alpha$ is primarily a function of the grain boundary. Materials such as silicon carbide exhibit nonlinear or exponential resistance characteristics and have been utilized in commercial silicon carbide varistors, however, such nonmetallic varistors typically exhibit an alpha ($\alpha$) exponent of no more than 6.

A new family of varistor materials having alphas in excess of 10 within the current density range of $10^{-3}$ to $10^2$ amperes per square centimeter has recently been produced from metal oxides although very few applications have been disclosed for this new metal oxide varistor (MOV) material. Although the alpha of the MOV materials in which range the alpha remains substantially constant are identified by the current density range of $10^{-3}$ to $10^2$ amperes per square centimeter, it is appreciated that the alphas remain high also at higher and lower currents although some deviation from maximum alpha values may occur. The MOV material is a polycrystalline ceramic material formed of a particulr metal oxide with small quantities of one or more other metal oxides being added. As one example, the predominant metal oxide is zinc oxide with small quantities of bismuth oxide being added. Other additives may be aluminum oxide, iron oxide, magnesium oxide, and calcium oxide as other examples. The predominant metal oxide is sintered with the additive oxide(s) to form a sintered ceramic metal oxide body. Since the MOV is fabricated as a ceramic powder, the MOV material can be pressed into a variety of shapes of various sizes. Being polycrystalline, the characteristics of the MOV are determined by the grain (crystal) size, grain composition, grain boundary composition, and grain boundary thickness, all of which can be controlled in the ceramic fabrication process.

The nonlinear resistance relationship of the MOV is such that the resistance is very high (up to approximately 10,000 megohms) at very low current levels in the microampere range and progresses in a nonlinear manner to an extremely low value (tenths of an ohm) at high current levels. The resistance is also more nonlinear with increasing values of alpha. These nonlinear resistance characteristics result in voltage versus current characteristics wherein the voltage is effectively limited, the voltage limiting or clamping action being more enhanced at the higher values of the alpha exponent as shown in FIG. 1. Thus, the voltage versus current characteristics of the MOV is similar to that of the Zener diode with the added characteristic of being symmetrically bidirectional and over more decades of current. The conduction mechanism of the MOV is not yet clearly understood but is completely unlike the avalanche mechanism associated with Zener diodes, a possible theoretical explanation of its operation being that of space charge limited current. The rated voltage and the voltage range over which the varistor effect occurs are determined by the particular composition of the MOV material and the thickness to which it is pressed in the fabrication process. The MOV involves conduction changes at grain boundaries resulting in the advantage of bulk phenomenon allowing great flexibility in the design for specific applications simply by changing the dimensions of the body of MOV material. That is, the current conduction in the absence of closely spaced electrodes along one surface of the MOV body is through the bulk thereof. The bulk property of the MOV also permits a much higher energy handling capability as compared to junction devices. Thus, since an MOV device can be built up to any desired thickness, it is operable at much higher voltages than the Zener diode junction device and can be used in a range from a few volts to several kilovolts. The voltage changes across a silicon carbide varistor device are much greater than across an MOV device for a given current change and thus the silicon carbide varistor has a much smaller voltage operating range thereby limiting its applications. The thermal conductivity of MOV material is fairly high (approximately one-half that of alumina) whereby it has a much higher power handling capability than silicon carbide, and it exhibits a negligible switching time in that its response time is in the subnanosecond domain. Finally, the MOV material and devices made thereof can be accurately machined, soldered, and operated at very low voltages, capabilities not possible for the larger grained silicon carbide.

The volts versus amperes characteristics plotted in FIG. 1a of the drawing illustrate the nonlinear or exponential resistance characteristics exhibited by MOV material, and in particular, indicate the increasing nonlinearity and enhanced voltage limiting obtained with increased values of the exponent alpha ($\alpha$). The VOLTS abscissa is in terms of the voltage appearinc across the power or main conductive path terminals of the MOV device in response to current flowing through the device and the CURRENT ordinate is in terms of current or current density through the bulk of the MOV material. Although the use of linear scales on the graph would show the decreasing slopes (decreasing resistance values) with increasing currents, such curves can be readily manipulated by the choice of scales, and for this reason, log-log scales are chosen to obtain a family of lines each of which remains substantially straight within the indicated current range. It can be seen from the FIG. 1a plots that the resistance exhibited by the MOV material is quite high at low current levels and becomes increasingly smaller in a nonlinear manner with increasing current levels. Extension of the plots to lower and higher current levels would obviously indicate correspondingly much higher and lower resistances, respectively, and operation of the MOV device may transiently reach such levels depending upon the particular circuit application of the device.

Figure 1B:
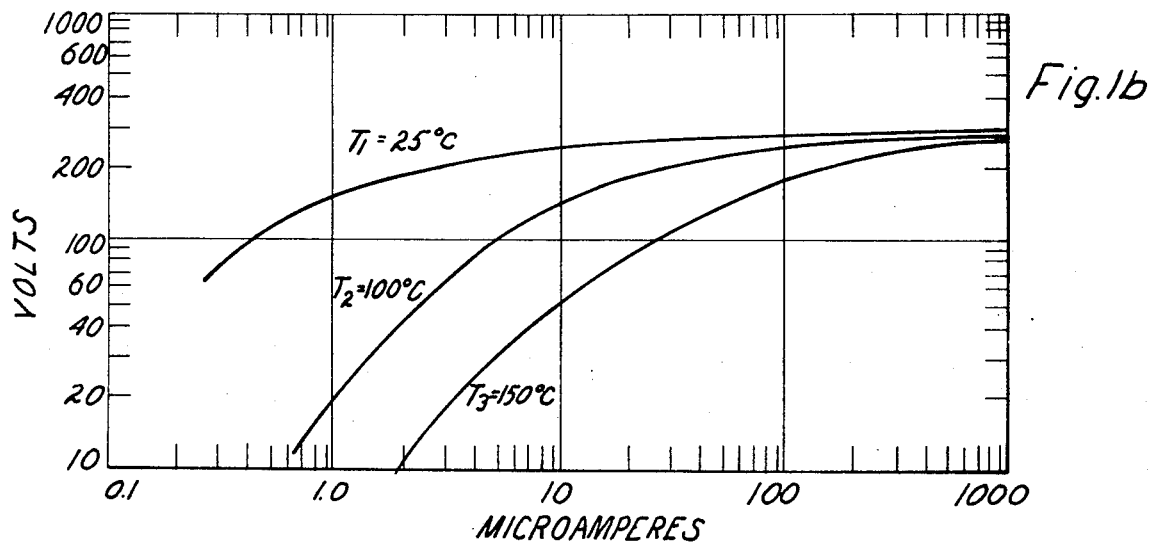
FIG. 1b is a simliar graphical representation indicating such characteristics for one value of alpha for different temperatures in the MOV material.

The FIG. 1b plots indicate the volts versus amperes characteristics exhibited by an MOV device for different temperatures of the MOV material. In particular, the negative temperature coefficient of resistance characteristics of the MOV material are seen to be more pronounced at the lower current levels, generally in the microampere range. Thus, at a current level of 1.0 microampere, the MOV material is much more temperature sensitive than at 10 or 100 microamperes, an increase in temperature from $T_1 = 25°C$ to $T_2 = 100°C$. producing a corresponding voltage decrease from 150 to 18 volts for a 300 volt, 1 milliampere steady-state rated MOV device having an alpha exponent of 25. These temperature characteristics are obviously true for only one particular MOV device but clearly indicate the temperature-sensitive nature of such material.

Figure 2:
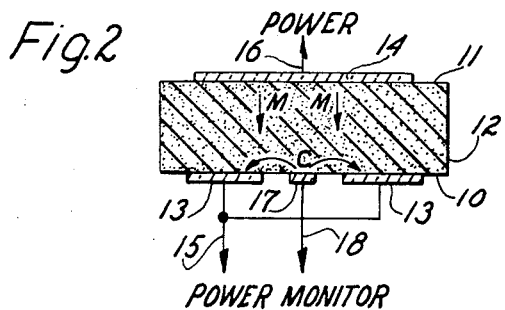
FIG. 2 is a sectional elevation view of a first embodiment of my integral sensor wherein the monitoring conductive path is close to the main conductive path.

Referring now to FIG. 2, there is shown a first embodiment of my integrated metal oxide varistor and sensor wherein the monitoring or sensing conductive path through the body of MOV material is in close proximity to the main (power) conductive path. The conventional MOV device includes a body of metal oxide varistor material having first and second opposed major surfaces, 10 and 11, respectively, and at least a third surface 12 disposed therebetween. In general, surfaces 10 and 11 are parallel to each other and third surface 12 is perpendicular thereto. Surfaces 10 and 11 are generally flat whereas surface 12 may be a curved surface defining a right cylinder body having a circular cross section or other curved cross sections. The cross section may also be square, rectangular or a polygon of any number of sides whereby surface 12 may include a single curved surface or number of intersecting surfaces which may be flat and, or curved. As mentioned hereinabove, the thickness of the MOV device is determined primarily by the voltage rating (rated voltage is generally the maximum steady state voltage that can be impressed across the MOV device without producing excessive power dissipation) and as examples, MOV devices having voltage ratings of 240 and 480 volts have thicknesses of 0.10 and 0.20 inches, respectively. Electrodes 13 and 14 are suitably connected to opposed surfaces 10 and 11, respectively, for providing good electrical and mechanical contact with such surfaces. The electrodes may have circular or square cross sections in the most typical examples thereof. As illustrated, electrode 14 is of circular shape whereas electrode 13 is of annular shape and is positioned in alignment with electrode 14. The electrodes form a metallized surface on the MOV material and may be attached to the surfaces thereof by a suitable bonding process which may be accomplished by low temperature soldering or by pressure contact as two examples. The metallized surface (electrode) may be obtained, for example, by firing a thin layer of silver-glass frit (silver and glass particles) on the MOV surface. Ohmic contact is utilized, in general, in order to take advantage of the bulk phenomenon operation of the MOV material. Suitable electrical conductors 15 and 16 are soldered or in any other well known manner connected to the outer surfaces of electrodes 13 and 14, respectively.

The addition of a third electrode for establishing a monitoring conductive path throuth the MOV material and the particular annular shape of electrode 13 constitute the basic novel features of the FIG. 2 embodiment of my invention. Thus, a third electrode 17 is attached to surface 10 of the MOV body in spaced but close proximity to electrode 13 such that a monitoring conductive path C is established through the MOV body between electrodes claim and 17 in close proximity to the main conductive path M established between electrodes 13 and 14. The main and monitoring conductive paths are established, of course, as a result of electric potentials applied across electrodes 13, 14 and 13,17, respectively. The geometry of the sensing path C is designed to produce substantially equipotential points at its terminals with respect to the potential developed by the current in the main path M. Electrode 17 is much smaller than electrodes 13 and 14 since the monitoring current is only a very small fraction of the main current flowing between electrodes 13 and 14. Electrode 17 is thus sized to sense a monitoring current of approximately 1 microampere when the steady state main current is in the order of 1 milliampere. The small monitoring current has a negligible effect on the main current and permits monitoring operation at the more temperature-sensitive region of the volt-ampere curve as illustrated in FIG. 1b. It should be obvious that other configurations of electrodes 13 and 17 can be utilized within the scope of my inventon as long as they meet the criteria of being in close proximity to each other and preferably located on the same major surface of the MOV body. Thus, electrode 13 may be circular or square in cross section, with or without a cutout center portion, and sensing electrode 17 can be located centrally thereof, as illustrated, or spaced in close proximity to the side thereof as other examples of electrode configurations. Electrode 17 is attached to the MOV body in the same manner as electrodes 13 and 14, and electrical conductor 18 is attached to the surface of electrode 17. The resistance of the MOV body along the monitoring conductive path as sensed across conductors 15 and 18 is utilized in a suitable bridge circuit to be described with reference to FIGS. 4a and 4b for monitoring the temperature of the MOV body.

Figure 3:
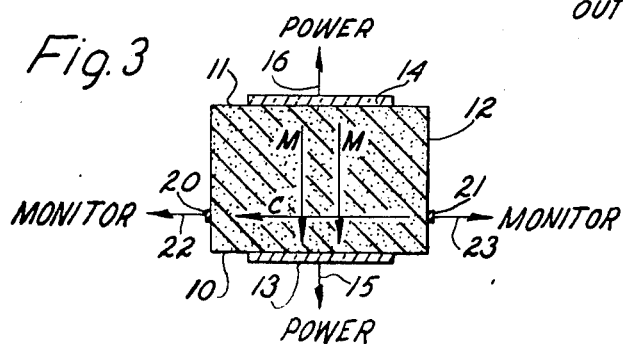
FIG. 3 is a sectional elevation view of a second embodiment of my invention wherein the monitoring conductive path is in intersecting relationship with the main conductive path.

Referring now in particular to FIG. 3, there is shown a second embodiment of my invention wherein the monitoring conductive path C intersects the main conductive path M rather than merely being positioned in close proximity thereto. This embodiment is especially useful for the larger bulk (greater relative thickness) MOV devices wherein the MOV body may have any of the shapes defined hereinabove. In order to establish such intersecting monitoring conductive path through the MOV body, a pair of third electrodes 20 and 21 are attached to the third surface 12 which interconnects the first and second surfaces 10 and 11, respectively. Electrodes 20 and 21 are again much smaller than electrodes 13, 14 and are positioned in alignment such that a straight line drawn through the centers of both electrodes preferably intersects the center line of the main conductive path between power electrodes 13 and 14. Electrode 13 is preferably of the same size and form as electrode 14 in this embodiment. Thus, in the case of the MOV body being a circular disk (i.e., a right cylinder having a circular cross section), electrodes 20 and 21 are positioned on the curved surface 12 in diametric opposition and are uniformly spaced from surface 10. In the case of the MOV body having a square or rectangular cross section, monitoring electrodes 20, 21 are positioned on opposing side surfaces 12 centrally between the side edges and again uniformly spaced from surface 10. The temperature-monitoring electrodes 20 and 21 generally need not be equally spaced (i.e., midway) from both surfaces 10 and 11 since the thickness of the MOV body is generally smaller than the width dimension wherein the thickness dimension is that betweeen surfaces 10 and 11. But more important, the potential of the sensing path with repsect to the main conductive path is determined by the location of electrodes 20 and 21 relative to surface 10. In my second embodiment depicted in FIG. 3, the (resistance) sensing signal which monitors the operating temperature of the MOV body is developed across conductors 22 and 23 connected to electrodes 20 and 21, respectively.

Figure 4A:
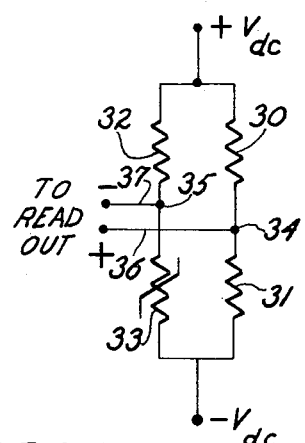
FIGS. 4a and 4b are schematic diagrams of bridge circuits suitale for providing a read out signal proportional to the operating temperature of the MOV body.
Figure 4B:
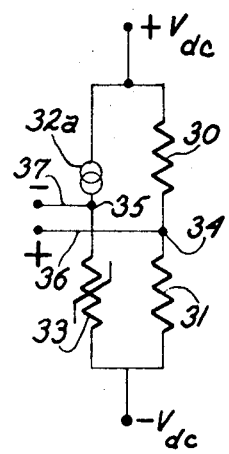

Referring now to FIG. 4a, there is shown a first bridge circuit for obtaining a read-out signal which is propertional to the operating temperature of the MOV body. In particular, the bridge circuit utilizes three resistors of known fixed resistance value in three of the legs of the bridge and the resistance of the MOV body is in the fourth leg. Resistors 30 and 31 are connected serially across an isolated source of constant direct current potential $\pm V_{dc}$. This source is isolated in order to permit grounding of the main (power) circuit. In like manner, resistor 32 and the monitoring conductive path through the MOV body 33 are connected serially across source $\pm V_{dc}$. Thus, the voltage drops across fixed resistors 30 and 31 remain fixed whereas the voltage drops across fixed resistor 32 and MOV body 33 vary in accordance with the temperature of the MOV body. Resistor 32 preferably has a resistance value substantially greater than the resistance of MOV body 33 at normal operating conditions thereof in order to reduce the effect of current variations in the MOV body and thereby approach the condition wherein resistor 32 has the characteristics of a constant current source. In the case of the FIG. 2 embodiment of MOV body 33, the end of resistor 32 remote from the voltage $+V_{dc}$ is connected to conductor 18 and conductor 15 is connected to voltage $-V_{dc}$. In the FIG. 3 embodiment, the remote end of resistor 32 is connected to conductor 22 (or 23) and conductor 23 (or 22) is connected to voltage $-V_{dc}$.

The voltage source $\pm V_{dc}$ and resistance values of resistors 30, 31 and 32 may be established for obtaining a read-out signal which is a nonlinear function of the temperature of the MOV body. In this arrangement, the resistance values of resistors 30 and 32 are equal, and the resistance values of resistor 31 and the MOV body 33 are equal at a selected operating temperature of body 33, or more generally, the ratio of the resistance values of resistor 30 to resistor 31 is chosen to be equal to the ratio of the resistance values of resistor 32 to MOV 33 at a selected operating temperature of MOV body 33 which may be described as the standard or normal operating temperature when the MOV body is operated at rated voltage and rated current. Thus, at normal operating conditions of the MOV body 33, the voltages at juncture 34 (of resistor 30 and 31) and juncture 35 (of resistor 32 and MOV 33) are equal, and the read-out voltage signal developed across these two junctures is therefore zero. Conductors 36 and 37 are connected to junctures 34 and 35, respectively, and may have second ends thereof connected to a comparator or to a voltage amplifier for further processing of the read-out signal.

Assuming the temperature in the MOV body 33 rises above the normal value, the negative temperature coefficient characteristics of the MOV body cause the resistance thereof to decrease as indicated in FIG. 1b, thereby reducing the voltage drop across the MOV sensing electrodes 20 and 21. Under such condition, the positive voltage at juncture 34 is greater than at juncture 35 and provides the illustrated polarity read-out voltage. A calibration curve is developed for the particular size MOV body for establishing the nonlinear read-out volts versus temperature characteristics. Obviously, a voltmeter scaled in terms of such calibration can provide a direct read-out of the temperature. Alternatively, the bridge circuit resistor values may be established for providing an output only when the temperature of the MOV body exceeds a predetermined permissible maximum temperature. Under this alternative arrangement, the juncture voltages are mismatched at normal operating temperatures (voltage at juncture 35 is more positive than at juncture 34) and become matched at the critical temperature. Any higher temperature causes the relative polarity of voltages illustrated in FIG. 4a (juncture 34 voltage more positive than juncture 35 voltage) and such signal may be utilized to initiate an alarm or provide some other type of visual or audible read-out, or cause a particular action in the MOV circuit such as reducing the voltage applied across the MOV power terminals.

The FIG. 4a bridge circuit is of the constant voltage type and results in some current variation (increase) through the monitoring conductive path of MOV body 33 for a temperature variation (increase) in the MOV body. As an alternative, the bridge circuit may be of the constant current type illustrated in FIG. 4b wherein a conventional constant current (infinite impedance) source 32a replaces resistor 32. The advantage of the FIG. 4b embodiment over the FIG. 4a embodiment is that operation is along a constant current line (such as 1.0 microampere in FIG. 1b) instead of along a constnat resistance line thereby eliminating the temperature change due to current change which, although small, is inherent in the FIG. 4a embodiment.

Having described two embodiments of my integral sensor for a metal oxide varistor device, it should be obvious that the bodies of MOV material can assume any of a number of shapes as dictated by the particular application and the electrodes can be of various shapes and oriented in various configurations, the criteria being that the monitoring conductive path be established such that it senses the operating temperature of the metal oxide varistor body at some point which bears a direct relationship to the main conductive path. Although the invention has been specifically described with reference to metal oxide varistors, it should be obvious that it is equally applicable to nonmetallic varistors such as the silicon carbide type. Thus, while my invention has been particularly shown and described with reference to two illustrated embodiments thereof, it should be obvious by those skilled in the art that various changes in form and detail may be made without departing from the scope of the invention as defined by the following claims.

What I claim as new and desire to secure by Letters Patent of the United States is:

1. An integral sensor for monitoring the temperature state of an included metal oxide varistor device comprising
    a body of metal oxide varistor material having first and second opposed major surfaces and at least a third surface disposed therebetween,
    first and second electrodes in respective contact with said first and second opposed surfaces, said first and second electrodes positioned for establishing a main conductive path through the body of metal oxide varistor material, and
    at least a third electrode in contact with one of the several surfaces of said metal oxide varistor device, said third electrode disposed in spaced apart relationship with said first and second electrodes and in a predetermined position relative to the main conductive path for establishing a monitoring conductive path for monitoring the operating temperature of the metal oxide varistor body along the main conductive path as a function of the resistance of the body as sensed by the third electrode.

2. The integral sensor set forth in cliam 1 wherein said at least third electrode is a single third electrode in contact with said first surface and positioned in close proximity to said first electrode whereby the monitoring path is close to the main conductive path.

3. The integral sensor set forth in claim 2 wherein said first electrode is of annular shape, and
    said third electrode is positioned in spaced apart relationship from the inner edge of said first electrode.

4. The integral sensor set forth in claim 3 wherein said third electrode is concentric with said first electrode and uniformly spaced from the inner edge thereof.

5. The integral sensor set forth in claim 4 and further comprising
    a first electrical conductor havng a first end connected to said third electrode, and
    a second electrical conductor having a first end connected to said first electrode, the resistance of the metal oxide varistor body as sensed across second ends of said first and second conductors being variables as a function of the operating temperature of the metal oxide varistor body.

6. The integral sensor set forth in claim 2 wherein said at least third electrode consists of third and fourth electrodes in contact with the third surface interconnecting the first and second surfaces.

7. The integral sensor set forth in claim 6 wherein said third surface is a surface defining the side wall of a cylinder, and
    said third and fourth electrodes are positioned on opposite sides of said third surface.

8. The integral sensor set forth in claim 7 wherein said first, second and third surfaces form a right cylinder,
    said first and second electrodes are positioned centrally on said first and second surfaces, and
    said third and fourth electrodes are uniformly spaced from said first surface.

9. The integral sensor set forth in claim 8 wherein said first, second and third surfaces form a right cylinder having a circular cross section, and said third and fourth electrodes are diametrically opposed on said third surface whereby the monitoring path between said third and fourth electrodes intersects the main conductive path.

10. The integral sensor set forth in claim 8 wherein said first, second and third surfaces form a right cylinder, said first and second electrodes are positioned centrally on said first and second surfaces, and said third and fourth electrodes are equally spaced from said first and secnd surfaces and diametrically opposed on said third surface.

11. The integral sensor set forth in claim 9 and further comprising a first electrical conductor having a first end connected to said third electrode, and a second electrical conductor having a first end connected to said fourth electrode, the resistance of the metal oxide varistor body as sensed across second ends of said first and second conductors being variable as a function of the operating temperature of the metal oxide varistor body.

12. The integral sensor set forth in claim 1 wherein said body of metal oxide varistor material has an alpha exponent in excess of 10.

13. An integral sensor for monitoring the temperature state of an included nonlinear resistance device comprising a body of varistor material exhibiting nonlinear resistance characteristics and having first and second opposed major surfaces and at least a third surface disposed therebetween, first and second electrodes in respective contact with said first and second opposed surfaces, said first and second electrodes positioned for establishing a main conductive path through the body of nonlinear resistance material, and at least a third electrode in contact with one of the several surfaces of said nonlinear resistance device, said third electrode disposed in spaced apart relationship with said first and second electrodes and in a predetermined position relative to the main conductive path for establishing a monitoring conductive path for monitoring the operating temperature of the nonlinear resistance body along the main conductive path as a function of the resistance of the body as sensed by the third electrode.

* * * * *